United States Patent
Pedersen et al.

(10) Patent No.: US 9,646,177 B2
(45) Date of Patent: May 9, 2017

(54) SYSTEMS AND METHODS FOR PREVENTING DATA REMANENCE IN MEMORY SYSTEMS

(75) Inventors: Bruce B. Pedersen, Sunnyvale, CA (US); Dirk A. Reese, Campbell, CA (US)

(73) Assignee: Altera Corporation, San Jose, CA (US)

( * ) Notice: Subject to any disclaimer, the term of this patent is extended or adjusted under 35 U.S.C. 154(b) by 316 days.

(21) Appl. No.: 13/098,012

(22) Filed: Apr. 29, 2011

(65) Prior Publication Data
US 2012/0274353 A1  Nov. 1, 2012

(51) Int. Cl.
G06F 7/38 (2006.01)
G06F 21/79 (2013.01)
G06F 21/76 (2013.01)
G11C 7/20 (2006.01)
G11C 11/419 (2006.01)

(52) U.S. Cl.
CPC .............. *G06F 21/79* (2013.01); *G06F 21/76* (2013.01); *G11C 7/20* (2013.01); *G11C 11/419* (2013.01)

(58) Field of Classification Search
CPC .............. H03K 19/20; H03K 19/17768; H03K 19/177; H03K 19/1733; H03K 19/17756; H03K 19/1776; H03K 19/0016; H03K 19/17728; G06F 17/5054; G06F 21/76; G06F 21/79; G06F 7/575; G06F 9/3001; G06F 9/30029; G06F 15/7867
USPC .................. 326/6–7, 37–41, 47, 52, 104; 365/154–156
See application file for complete search history.

(56) References Cited

U.S. PATENT DOCUMENTS

| | | | | |
|---|---|---|---|---|
| 5,406,627 A | * | 4/1995 | Thompson | H04K 1/02 348/E7.055 |
| 5,581,202 A | * | 12/1996 | Yano et al. | 326/101 |
| 5,950,225 A | * | 9/1999 | Kleiman | G06F 11/1076 711/111 |
| 6,181,164 B1 | * | 1/2001 | Miller | H03K 19/1736 326/40 |
| 6,246,603 B1 | | 6/2001 | Brady | |
| 7,526,785 B1 | * | 4/2009 | Pearson | G06F 21/57 725/31 |
| 7,548,473 B2 | * | 6/2009 | Chen | G11C 29/50 365/189.07 |
| 7,567,467 B2 | | 7/2009 | Macri et al. | |

(Continued)

OTHER PUBLICATIONS

Gutmann, "Data Remanence in Semiconductor Devices," Proceedings of the 10th Usenix Security Symposium, Washington, D.C., Aug. 13-17, 2001, Usenix Assoc., pp. 39-54, XP002685857.

*Primary Examiner* — Daniel D Chang
(74) *Attorney, Agent, or Firm* — Fletcher Yoder, P.C.

(57) ABSTRACT

Methods, circuits, and systems for preventing data remanence in memory systems are provided. Original data is stored in a first memory, which may be a static random access memory (SRAM). Data is additionally stored in a second memory. Data in the first memory is periodically inverted, preventing data remanence in the first memory. The data in the second memory is periodically inverted concurrently with the data in the first memory. The data in the second memory is used to keep track of the inversion state of the data in the first memory. The original data in the first memory can be reconstructed performing a logical exclusive-OR operation between the data in the first memory and the data in the second memory.

17 Claims, 5 Drawing Sheets

(56) References Cited

U.S. PATENT DOCUMENTS

| | | | | |
|---|---|---|---|---|
| 7,818,638 | B2* | 10/2010 | Baker | G11C 11/5678 |
| | | | | 341/143 |
| 7,925,912 | B1* | 4/2011 | Moss | G06F 1/12 |
| | | | | 326/93 |
| 2005/0055491 | A1* | 3/2005 | Macri | G11C 7/1006 |
| | | | | 711/1 |
| 2006/0023486 | A1 | 2/2006 | Furusawa et al. | |
| 2006/0198233 | A1* | 9/2006 | Smith | G11C 7/1051 |
| | | | | 365/189.05 |
| 2007/0226806 | A1* | 9/2007 | Tung | G06F 21/72 |
| | | | | 726/27 |
| 2007/0242538 | A1* | 10/2007 | Chen | G11C 29/50 |
| | | | | 365/201 |
| 2007/0271421 | A1* | 11/2007 | Kim | G11C 11/412 |
| | | | | 711/154 |
| 2008/0059854 | A1* | 3/2008 | Chan | G01R 31/318547 |
| | | | | 714/726 |
| 2008/0244182 | A1 | 10/2008 | Abella et al. | |
| 2008/0270805 | A1* | 10/2008 | Kean | G06F 17/5054 |
| | | | | 713/189 |
| 2009/0172496 | A1 | 7/2009 | Roine | |
| 2010/0138619 | A1 | 6/2010 | Benavides | |
| 2011/0176357 | A1* | 7/2011 | Koyama | G11C 11/412 |
| | | | | 365/149 |
| 2013/0262358 | A1* | 10/2013 | Heliot | G06N 3/04 |
| | | | | 706/27 |

\* cited by examiner

SYSTEMS AND METHODS FOR PREVENTING DATA REMANENCE IN MEMORY SYSTEMS

FIELD OF THE INVENTION

The present invention relates to memory systems and methods, and more specifically to preventing data remanence in a memory system by periodically inverting data in the memory system while keeping track of an inversion state.

BACKGROUND OF THE INVENTION

Data storage systems, and in particular random access memories such as static random access memory (SRAM) or dynamic random access memory (DRAM), are well known. Such data storage systems may be employed in a general purpose microprocessor, or used as a resource by a programmable logic device such as a field-programmable gate array (FPGA).

A memory such as SRAM or DRAM depends on a constant supply of power to retain data stored within the memory, and data is lost after the power to the memory is switched off. However, certain physical characteristics of such a memory lead to the phenomenon of data remanence, wherein data is retained in a residual form for some time after power source is removed from the memory. Such residual data can be recovered with some probability by accessing the input/output pins of the memory. The longer a constant datum is kept in a memory cell, the stronger the resulting data remanence, and the greater the probability that the datum can be recovered from the memory cell even after power is switched off.

Data remanence presents security problems for memories within systems using encryption. Such systems may use an encryption or security key, which is stored in a RAM portion of the system. Such systems may additionally include anti-tamper mechanisms, which erase all data in a system if an intrusion is detected. However, an attack based on data remanence inherently occurs when power to the entire system is switched off, rendering any anti-tamper mechanisms inoperable. Because of data remanence, critical data such as the encryption key or the security key may be retained in the RAM portion of the system long enough for an attacker to recover the key. The attacker can restore power to only the RAM portion of the system, recover the key, and use the key to recover critical data present on the system.

SUMMARY OF THE INVENTION

To address the above and other shortcomings within the art, the system according to the present invention prevents data remanence in a memory system by periodically inverting data in the memory system while keeping track of the inversion state.

In one embodiment, the system includes a static random access memory (SRAM) and a second memory. The system further includes processing circuitry operable to periodically invert data in the SRAM and concurrently invert data in the second memory. The processing circuitry is further operable to perform a logical exclusive-OR operation between the data in the SRAM and the data in the second memory.

In another embodiment, the system includes a first memory, which operates according to a first clock signal, and a second memory. The system further includes processing circuitry operable to periodically invert data in the first memory and concurrently invert data in the second memory, wherein the data in the first memory and the data in the second memory are both inverted at a periodic inversion rate according to a second clock signal, and wherein the second clock signal is different from the first clock signal. The processing circuitry is further operable to perform a logical exclusive-OR operation between the data in the first memory and the data in the second memory.

In yet another embodiment, the system includes a first memory and a second memory. The system further includes exclusive-OR circuitry for providing an exclusive-OR circuit output signal, wherein the exclusive-OR circuit output signal is a logical exclusive-OR function of a data output signal of the first memory and a data output signal of the second memory. The system further includes selection circuitry for using a first signal to select a second signal or a complemented data output signal of the first memory as a selection circuit output signal. The system further includes interconnection circuitry configurable to couple a complemented data output signal of the second memory to a data input signal of the second memory, couple the first signal to a reset signal of the second memory, and couple the selection circuit output signal to a data input signal of the first memory.

Advantageously, the above embodiments in accordance with the present invention prevent data remanence in the SRAM while being compatible with the normal operation of the SRAM.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
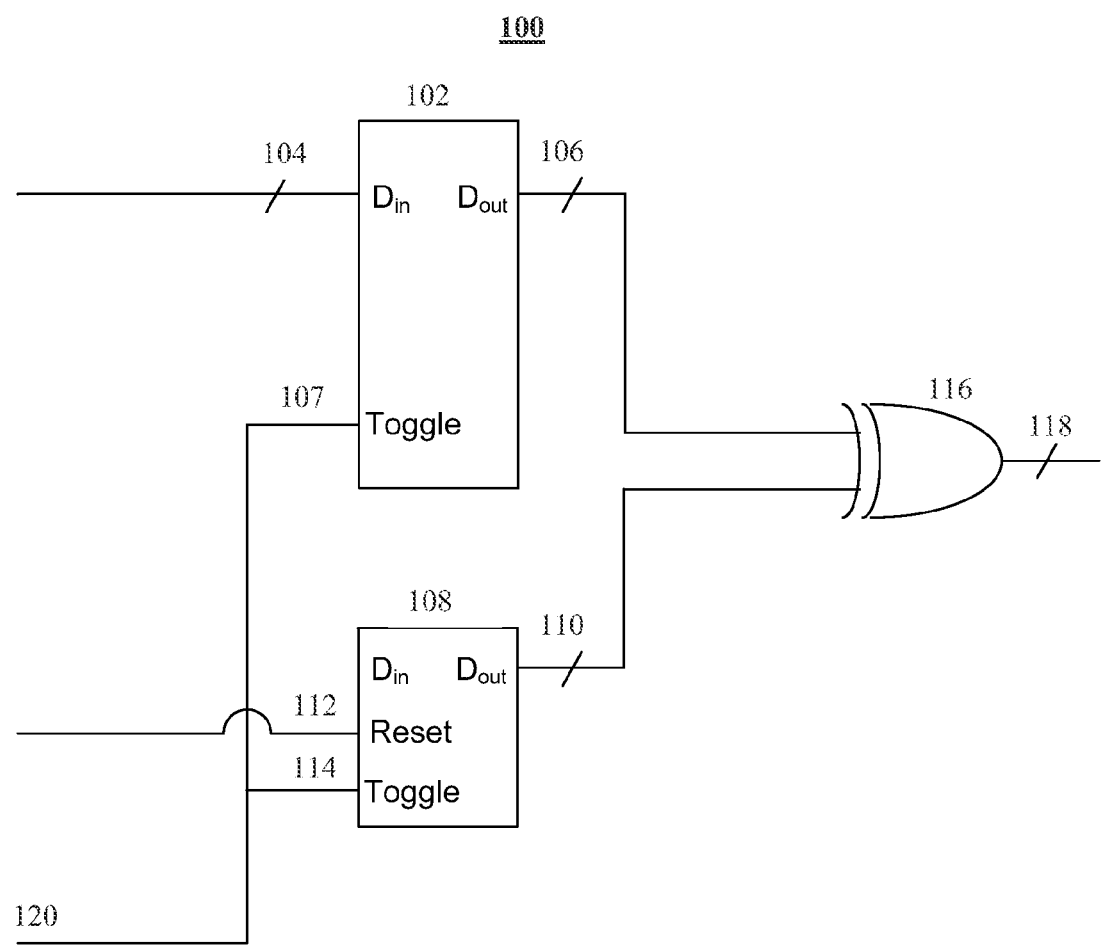
FIG. 1 shows an exemplary system for preventing data remanence in accordance with an embodiment of the present invention.

FIG. 1 illustrates an exemplary system 100 for preventing data remanence in accordance with embodiments of the present invention. In some embodiments, the system 100 is located within a field-programmable gate array (FPGA) and interfaces directly with the FPGA. In other embodiments, the system 100 is located outside an FPGA, but its inputs and outputs are connected to the FPGA by an interface. In some embodiments, the system 100 stores a cryptographic key. If the system 100 interfaces with an FPGA, the cryptographic key can be used by an FPGA to encrypt data stored and communicated by the FPGA.

The system 100 includes a main memory 102. The main memory 102 includes one or more memory cells each including one bit of data, along with circuitry for writing data to the appropriate memory cells and reading the data from the appropriate memory cells. The main memory 102 can include an SRAM. The main memory 102 can also include one or more latched registers. The main memory 102 can also include a DRAM. If the main memory 102 includes a DRAM, the DRAM is associated with a refresh clock which periodically refreshes data values stored in the DRAM according to well-known methods. In some embodiments, the main memory 102 is associated with a system clock. The system clock determines when data is to be written to or read from the main memory 102, as well as the rate at which data is written to or read from the main memory 102. If system 100 interfaces with an FPGA, the system clock can be generated by the FPGA.

The main memory 102 additionally includes a plurality of ports, such as a data input port 104, a data output port 106, and a data toggle port 107. The main memory 102 may contain additional ports, such as read and write address ports or a system clock input port. For simplicity, these ports are not shown. In some embodiments, the data input port 104 and the data output port 106 have a predefined bit width—for example, each may be 16 bits wide. In other embodiments, the bit width of each of the ports is configurable.

The system 100 further includes a second memory 108. The second memory 108 includes one or more memory cells each including one bit of data, along with circuitry for writing data to the appropriate memory cells and reading the data from the appropriate memory cells. The second memory 108 can include one or more latched registers. The second memory 108 can also include an SRAM or a DRAM. In some embodiments, the second memory 108 is at least partially located within the main memory 102, and may be an integral part of the main memory 102. In other embodiments, the second memory 108 is located completely outside the main memory 102.

The second memory 108 includes a data output port 110, a data reset port 112, and a data toggle port 114. The second memory 108 may contain additional ports, such as read and write address ports or a system clock input port. For simplicity, these ports are not shown.

The system 100 further includes exclusive-OR circuitry 116. The exclusive-OR circuitry 116 is coupled to the data output port 106 of the main memory 102 and the data output port 110 of the second memory 108. The exclusive-OR circuitry 116 outputs one or more signals 118 which are a logical exclusive-OR function of one or more signals received from the data output port 106 of the main memory 102 and one or more signals received from the data output port 110 of the second memory 108. In some embodiments, the second memory 108 includes one memory cell containing one bit of data (i.e., a single logical '1' or a logical '0'), and each of the one or more exclusive-OR circuitry output signals 118 corresponds to an logical exclusive-OR operation between the bit of data output by the output port 110 of the second memory 108 and one of the one or more signals output by the output port 106 of the main memory 102.

The system 100 provides a toggle signal 120 to the toggle port 107 of the main memory 102 and the toggle port 114 of the second memory 108. In some embodiments, the toggle signal 120 is provided by an outside system, and is activated and deactivated according to an arbitrary schedule. In some embodiments, the toggle signal 120 is provided by a second clock having a certain clock rate. The clock rate of the second clock can be configurable. In some embodiments, the clock rate of the second clock is configurable by a user of the system 100. In some embodiments, the second clock is independent of the system clock, and if the main memory 102 is a DRAM, the second clock is independent of the refresh clock of the DRAM. In some embodiments, the second clock is slower than the system clock, and if the main memory 102 is a DRAM, the second clock is slower the refresh clock of the DRAM. In these embodiments, the second clock may have a clock rate that is measured in seconds or minutes.

Figure 3:
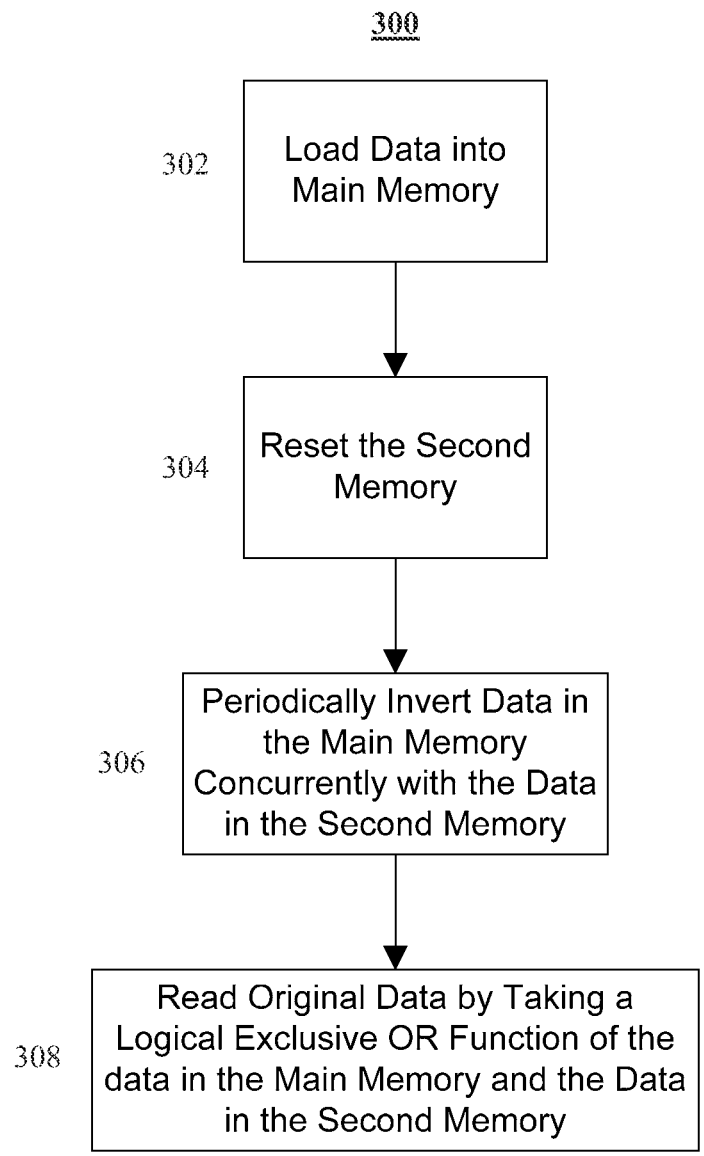
FIG. 3 shows an illustrative method of preventing data remanence in accordance with an embodiment of the present invention.

FIG. 3 illustrates a method 300 of preventing data remanence using the system 100 of FIG. 1. At 302, original data is loaded into the main memory 102. The original data may comprise one or more original data values. At 304, the second memory 108 is reset, so that all data contained within the memory 108 is set to a logical '0'. The system 100 may reset the second memory 108 by asserting the reset port 112 to a logical '1'. At 306, the one or more data values within the main memory 102 are periodically inverted concurrently with the data in the second memory 108. The system 100 may invert the data by asserting the toggle signal 120 to a logical '1'. In response to detecting the assertion of the toggle signal 120 to a logical '1', processing circuitry associated with the main memory 102 and the second memory 108 inverts (i.e. toggles) the one or more data values in the main memory 102 and the data in the second memory 108. Because the data in the second memory 108 are set to a known reset state at 304 after the original data is loaded 302, and because the data in the main memory 102 are inverted concurrently with the data in the second memory 108, the data in the second memory 108 always indicate a current inversion state of data in the main memory 102. The data in the second memory 108 can thus be used to reconstruct the original data loaded into the main memory 102 at 302 by inverting the data in the main memory 102 during readout if the data in the main memory 102 is in an inverted state, and taking no action during readout if the data in the main memory 102 is in a non-inverted state.

In particular, in the method 300 using the system 100 of FIG. 1, the original data are reconstructed by taking a logical exclusive-OR function of one or more signals received from the data output port 106 of the main memory 102 and one or more signals received from the data output port 110 of the second memory 108. At 308, the original data are read as one or more output signals 118 output by the exclusive-OR circuitry 118. Advantageously, because the data in the one or more memory cells of the main memory 102 are periodically inverted at 306, no memory cell contains the same data value for more than a certain period of time. If the rate of periodic inversion is sufficiently rapid (i.e. greater than a certain threshold rate, which depends on the physical characteristics and operating parameters of the main memory 102), data remanence should not occur, or should at least be reduced. An additional advantage is that in some embodiments, the second memory 108 including only a single memory cell containing one bit of data can be used to protect a first memory 102 of arbitrary size against data remanence.

Figure 2:
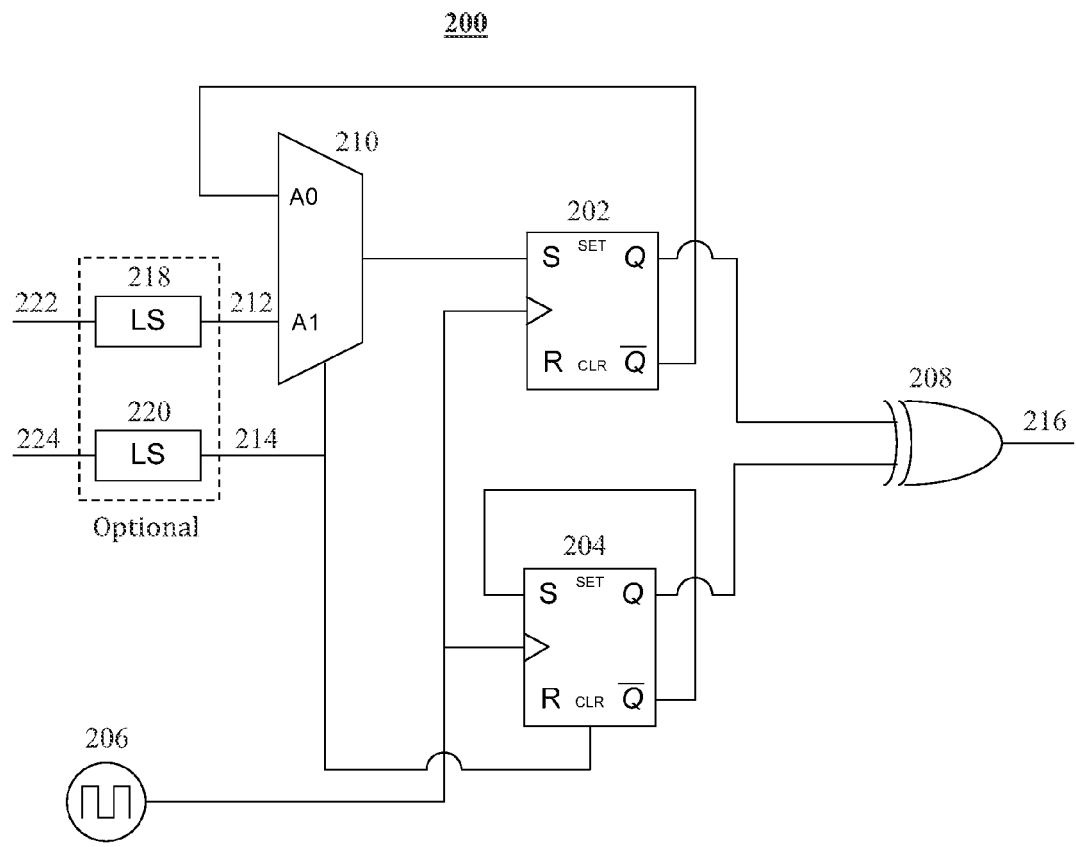
FIG. 2 shows another exemplary system for preventing data remanence in accordance with an embodiment of the present invention.

FIG. 2 shows another exemplary system 200 for preventing data remanence in accordance with the present invention. In some embodiments, the system 200 is located within a field-programmable gate array (FPGA) and interfaces directly with the FPGA. In other embodiments, the system 200 is located outside an FPGA, but its inputs and outputs are connected to the FPGA by an interface. In some embodiments, the system 200 stores a cryptographic key. If the system 200 interfaces with an FPGA, the cryptographic key can be used by an FPGA to encrypt data stored and communicated by the FPGA.

System 200 contains a main memory. The main memory can include one or more data registers each including one bit of data. However, only one data register 202 is shown for simplicity. In one embodiment, the data register 202 is an SRAM. System 200 further includes an inversion tracker register 204 containing one bit of data. Complemented output port of the inversion tracker register 204 is coupled to the input port of the inversion tracker register 204.

A clock signal 206 is coupled to the clock input ports of the data register 202 and the inversion tracker register 204. In one embodiment, the clock rate of the clock signal 206 is configurable.

The data output ports of the data register 202 and inversion tracker register 204 are coupled to an exclusive-OR gate 208. The exclusive-OR gate 208 outputs a signal 216 which is a logical exclusive-OR function of the signals output by the output ports of the data register 202 and inversion tracker register 204.

The system 200 further includes selection circuitry 210. In one embodiment, the selection circuit 210 is a multiplexer having two inputs and one output. The first selection circuitry input is coupled to a complemented output port of the data register 202. A second selection circuitry input is coupled to a data input signal 212. Load signal 214 is used by the selection circuit 210 to select between a signal from the complemented output port of the data register 202 and the data input signal 212. The data input signal 212 is used to load original data into the data register 202. The load signal 214 is additionally coupled to the reset port of the inversion tracker register 204.

In some embodiments, the system 200 also includes level shifter circuitry 218 and 220. The level shifter circuitry 218 couples the data input signal 212 to an outside data input signal 222, and the level shifter circuitry 220 couples the load signal 214 to an outside load signal 224. The level shifter circuitry 218 and 220 may be used to interface the system 200 with outside systems by translating voltage levels associated in the outside systems with a logical '1' and a logical '0' to voltage levels associated in the system 200 with a logical '1' and a logical '0', respectively. In some embodiments, the outside system is an FPGA. In some embodiments, the outside data input signal 222 is used to provide the system 200 with a cryptographic key.

Figure 4:
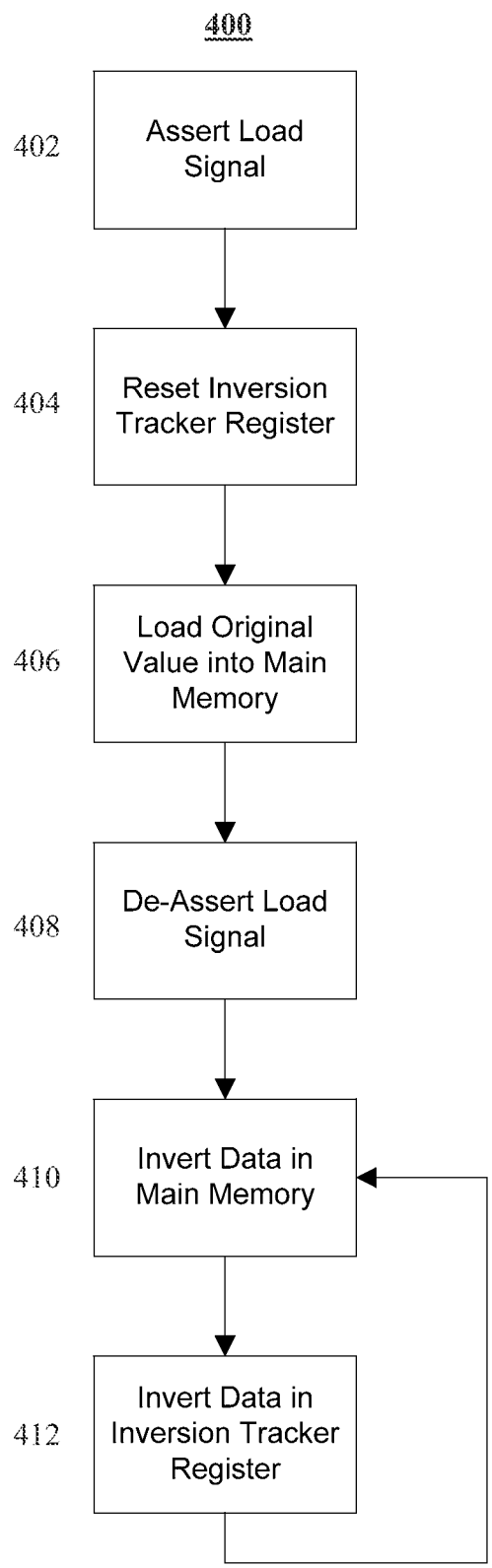
FIG. 4 shows another illustrative method of preventing data remanence in accordance with an embodiment of the present invention.

FIG. 4 shows an illustrative method for operating the system 200 of FIG. 2. At 402, the load signal 214 is asserted to a value of '1', coupling the data input signal 212 to the input port of the data register 202 via the selection circuit 210. At 404, the load signal 214 resets the inversion tracker register 204 to '0'. At 406, the data value of the data input signal 212 is loaded into the data register 202. At 408, the load signal 214 is switched to '0', coupling the inverted output signal of the data register 202 to the data input port of the data register 202 via the selection circuit 210. At 410, during each new period of the clock signal provided by the clock 206, the data input port of inversion tracker register 204 accepts the complemented data output signal of the inversion tracker register 204. The datum contained within the inversion tracker register 204 is thus inverted (i.e. toggled) until the next period of the clock signal provided by the clock 206. Likewise, at 412, during each new period of the clock signal provided by the clock 206 the data input port of data register 202 accepts the complemented data output signal of the data register 202, which is the output of the selection circuit 210. The datum contained within the data register 202 is thus inverted (i.e. toggled) until the next period of the clock signal provided by the clock 206. The method then returns to 410.

It should be noted that the exclusive-OR gate 208 continuously outputs a signal 216, accessible at each step of the method 400, which is a logical exclusive-OR function of the signals output by the output ports of the data register 202 and inversion tracker register 204. The signal 216 at all times corresponds to the original data value loaded into the data register 202 at 406.

Advantageously, because the datum in the data register 202 is periodically inverted at 410, the data register 202 does not contain the same data value for more than a certain period of time. In some embodiments, the length of this certain period of time corresponds to the length of the period of the clock signal provided by the clock 206. If the rate of periodic inversion is sufficiently rapid (i.e. greater than a certain threshold rate, which depends on the physical characteristics and operating parameters of the data register 202), data remanence should not occur, or should at least be reduced. An additional advantage is that in some embodiments, the inversion tracker register 204 containing only one bit of data can be used to protect an arbitrarily large number of data registers against data remanence.

Figure 5A:
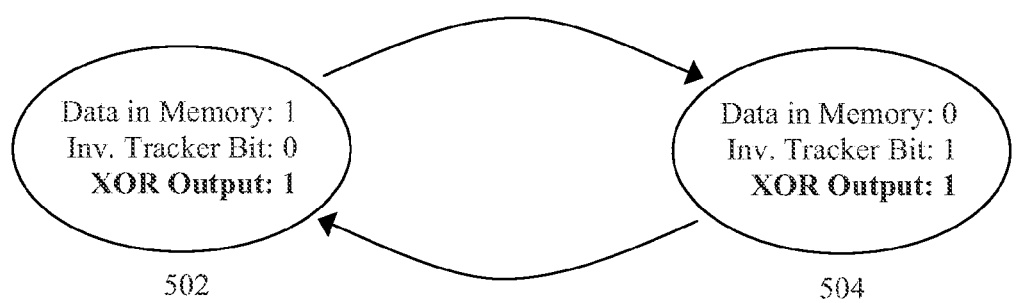
FIG. 5 shows an illustrative data flow diagram in a system operated according to the illustrative method of FIG. 4 in accordance with an embodiment of the present invention.
Figure 5B:
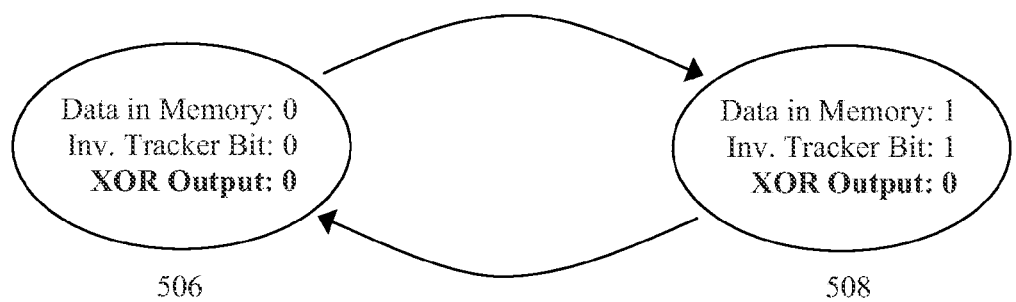

FIGS. 5a and 5b provide exemplary diagrams of data flow within the system 200 of FIG. 2 according to the method 400 of FIG. 2, for different data values originally stored in the data register 202.

FIG. 5a provides an exemplary diagram 500 of data flow within the system 200 of FIG. 2 according to the method 400 of FIG. 4, when a logical '1' is stored in the data register 202 at 406. At 408, before any data values are toggled, the system 200 is in state 502. In state 502, the value stored in the data register 202 is a '1', the value stored in the inversion tracker register 204 is a '0', and the output 216 of the exclusive-OR gate 208 is correspondingly a '1'. When the data within the data register 202 and inversion tracker register 204 are toggled at 410 and 412, the system switches to state 504. In state 504, the value stored in the data register 202 is a '0', the value stored in the inversion tracker register 204 is a '1', and the output 216 of the exclusive-OR gate 208 is correspondingly a '1'. The method 400 then proceeds back to 410, whereupon the system 200 again enters state 502. Thus, when a logical '1' is stored in the data register 202 at 406, the system 200 operated according to the method 400 always outputs an exclusive-OR circuit output signal 216 corresponding to a logical '1'.

FIG. 5b provides an exemplary diagram 501 of data flow within the system 200 of FIG. 2 according to the method 400 of FIG. 4, when a logical '0' is stored in the data register 202 at 406. At 408, before any data values are toggled, the system 200 is in state 506. In state 506, the value stored in the data register 202 is a '0', the value stored in the inversion tracker register 204 is a '0', and the output 216 of the exclusive-OR gate 208 is correspondingly a '0'. When the data within the data register 202 and inversion tracker register 204 are toggled at 410 and 412, the system switches to state 508. In state 508, the value stored in the data register 202 is a '1', the value stored in the inversion tracker register 204 is a '1', and the output 216 of the exclusive-OR gate 208 is correspondingly a '0'. The method 400 then proceeds back to 410, whereupon the system 200 again enters state 506. Thus, when a logical '0' is stored in the data register 202 at 406, the system 200 operated according to the method 400 outputs an exclusive-OR circuit output signal 216 corresponding to a logical '0'.

It should be noted that while systems 100 and 200 use the exclusive-OR circuitries 116 and 208, respectively, the use of exclusive-OR circuitries is exemplary, and is not intended to limit the scope of the present invention. In some embodiments, system 100 may replace the exclusive-OR circuitry 116 with any circuitry operable to output the original data loaded into the main memory 102 based on the bit of data output by the output port 110 of the second memory 108 and one of the one or more signals output by the output port 106 of the main memory 102. Likewise, in some embodiments, system 200 may replace the exclusive-OR circuitry 208 with any circuitry which outputs the original data loaded into the data register 202 based on the signals output by the output ports of the data register 202 and inversion tracker register 204. For example, if in states 502 and 506 of FIG. 5a the logical '0' stored in inversion tracker register 204 is replaced with a logical '1,' circuitry replacing circuitry 208 may output a signal 216 which is a logical inverted exclusive-OR function of the signals output by the output ports of the data register 202 and inversion tracker register 204.

The foregoing is merely illustrative of the principles of this invention and various modifications can be made by those skilled in the art without departing from the scope and spirit of the invention. The above described embodiments of the present invention are presented for purposes of illustration and not of limitation, and the present invention is limited only by the claims which follow.

What is claimed is:

1. A circuit comprising:
   a static random access memory (SRAM);
   a second memory; and
   processing circuitry operable to:
      periodically invert data within the SRAM and concurrently invert data within the second memory;
      perform a logical exclusive-OR operation between a data output signal of the SRAM and a data output signal of the second memory; and
      selection circuitry for using a first signal to select between a second signal and a complemented data output signal of the SRAM as a selection circuit output signal.

2. The circuit of claim 1, wherein the processing circuitry is further operable to:
   write data to the SRAM, and
   reset the second memory.

3. The circuit of claim 1, wherein at least a part of a combination of the second memory and the processing circuitry is located within the SRAM.

4. The circuit of claim 1, wherein the second memory and the processing circuitry are located outside the SRAM.

5. The circuit of claim 1, wherein a rate at which the processing circuitry is operable to periodically invert data within the SRAM concurrently with data within the second memory is configurable.

6. The circuit of claim 1, wherein:
   the SRAM comprises a plurality of memory cells each containing only one data bit, and
   the second memory comprises a register containing only one data bit.

7. The circuit of claim 1, wherein the SRAM is operable to store a cryptographic key.

8. A field-programmable gate array (FPGA) containing the circuit as defined in claim 1, wherein the SRAM is operable to store a cryptographic key, and wherein the cryptographic key is used by the FPGA to store and communicate data.

9. A circuit comprising:
   a first memory;
   a second memory;
   exclusive-OR circuitry for providing an exclusive-OR circuit output signal, wherein the exclusive-OR circuit output signal is a logical exclusive-OR function of a data output signal of the first memory and a data output signal of the second memory;
   selection circuitry for using a first signal to select a second signal or a complemented data output signal of the first memory as a selection circuit output signal; and
   interconnection circuitry configurable to:
      couple a complemented data output signal of the second memory to a data input signal of the second memory;
      couple the first signal to a reset signal of the second memory, and
      couple the selection circuit output signal to a data input signal of the first memory.

10. The circuit of claim 9, further comprising clock circuitry and additional interconnection circuitry configured to:
   couple a clock circuitry output signal to a clock input signal of the first memory, and
   couple the clock circuitry output signal to a clock input signal of the second memory.

11. The circuit of claim 9, wherein:
   the first memory comprises a plurality of memory cells each containing one data bit, and
   the second memory comprises a register containing one data bit.

12. The circuit of claim 9, wherein the first memory comprises static random access memory (SRAM).

13. The circuit of claim 9, wherein the selection circuitry comprises a multiplexer.

14. The circuit of claim 9, further comprising:
   first level shifter circuitry, wherein the interconnection circuitry is further configurable to:
      couple a first level shifter circuitry output signal to the second signal; and
   second level shifter circuitry, wherein the interconnection circuitry is further configurable to:
      couple a second level shifter circuitry input signal to a load signal, and
      couple a second level shifter circuitry output signal to the first signal.

15. The circuit of claim 9, wherein the first memory is used for storing a cryptographic key.

16. A field-programmable gate array (FPGA) containing the circuit as in claim 9.

17. The FPGA of claim 16, wherein:
   the first memory stores a cryptographic key, and
   the cryptographic key is used by the FPGA to store and communicate data.

* * * * *